Sept. 5, 1950     K. J. KOLLMANN     2,521,172
COUPLING
Filed Jan. 5, 1948

INVENTOR.
Karl J. Kollmann
BY
Florian G. Miller
ATTY.

Patented Sept. 5, 1950

2,521,172

UNITED STATES PATENT OFFICE 2,521,172

COUPLING

Karl J. Kollmann, Erie, Pa.

Application January 5, 1948, Serial No. 535

7 Claims. (Cl. 287—103)

This invention relates generally to couplings and more particularly to couplings for connecting together open helically wound rods.

Much difficulty has heretofore been experienced in connecting open helically wound rods, especially where the rods are subject to heavy stresses and lateral impacts, such as in connecting lengths of coiled wire for cleaning out and freeing a sewer line. In such a case, the connected rods must pass around traps and other bends in a sewer line while rotating at high speeds. Different types of pins have been heretofore used for connecting these coiled wires together but it has been found that due to the severe bends in the rods and the impacts against the sides of the pipes, the pins shear or they are driven laterally outwardly in many instances thereby leaving part of the connected rods in the pipe line which requires digging through the earth to the sewer line and removing the lengths of wire therefrom at great labor and expense, and ruination of the lawn and shrubbery. Furthermore, these prior connecting devices have been difficult to connect and disconnect and considerable time is wasted in making the connections and in the disconnections.

It is, accordingly, an object of my invention to overcome the above and other defects in couplings and it is more particularly an object of my invention to provide a coupling for connecting rods lengthwise which is simple in construction, economical in cost, economical in manufacture, and efficient in operation.

Another object of my invention is to provide a coupling which may be connected and disconnected in a minimum of time.

Another object of my invention is to provide a coupling for connecting flexible or open helically wound rods lengthwise.

Another object of my invention is to provide novel means in a coupling for connecting the ends of open helically wound rods.

Another object of my invention is to provide a coupling for connecting rods lengthwise which will not become uncoupled upon rotation thereof.

Other objects of my invention will become evident from the following detailed description, taken in conjunction with the accompanying drawings, in which Fig. 1 is a side elevational view of my novel coupling in a connected position;

Figure 1:
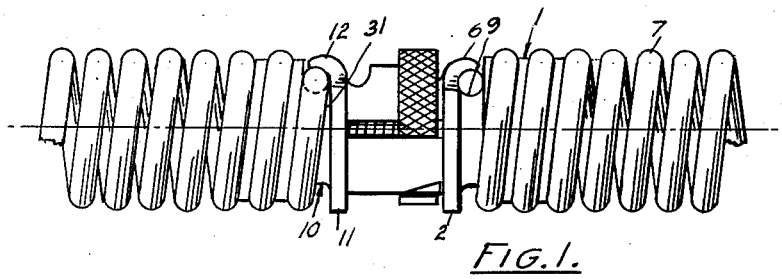
Figure 2:
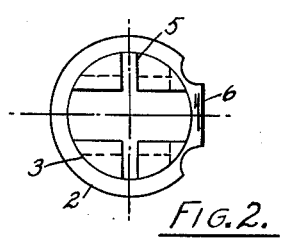
Fig. 2 is an end elevational view of the female coupling member of my novel coupling.
Figure 3:
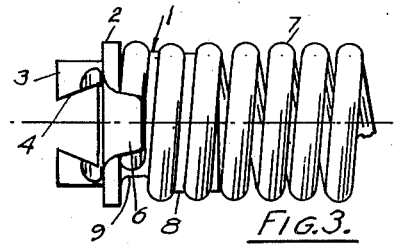
Fig. 3 is a side elevational view of the female coupling member of my novel coupling.

Referring now to the drawings, I show in Figs. 1 to 6 inclusive a female coupling member 1 having an outwardly directed shoulder 2 and a projecting connecting portion 3 having a transversely extending dovetailed groove 4 and a slot 5 at right angles to the dovetailed groove 4. A locking lip 6 is provided on the shoulder 2 of the female member 1 for securing the end of a helically wound rod 7 in threadable engagement with the threaded portion 8 of the female member 1. The groove 9 nearest the shoulder 2 is milled or cut parallel to a tangential line on the periphery thereof adjacent the lips 6 whereby the lip 6 may be peened over the end of the rod 7 to lock it in the groove 9.

Figure 4:
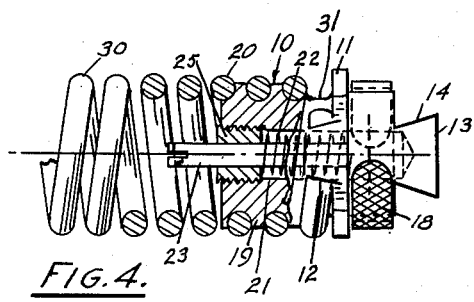
Fig. 4 is a side elevational view of my novel male coupling member, with parts thereof broken away for better illustration of the spring means for the locking member.
Figure 5:
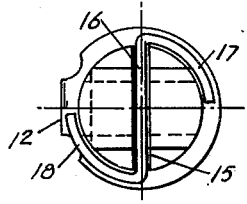
Fig. 5 is an end elevational view of the male coupling member shown in Fig. 4.

The male member 10 comprises an outwardly extending shoulder 11 having a laterally extending locking lip 12 formed thereon, a dovetailed projection 13 having the sides 14 thereof tapered to engage the dovetailed groove 4 in the connecting portion 3 of the female member 1. The dovetailed projection 13 has a transverse slot 15 formed therein for receiving a locking member 16 having off-set arcuate shaped knurled finger engaging portions 17 and 18 on opposite ends thereof extending clockwise so that the counter clockwise rotation of the coupling will not cause the finger engaging portions 17 and 18 to catch and open and unlock or uncouple the coupling members 1 and 10. The male member 10 has an outwardly projecting threaded portion 19 for threadably engaging the end 20 of open helically wound rod 30 which is locked by the locking lip 12 as shown in Fig. 4 in the groove 31 nearest the shoulder 11 which is milled or cut parallel to a tangential line on the periphery thereof adjacent the lip 12 whereby the lip 12 may be peened over the end of the rod 30 to lock it in the groove 31. The male member 10 has a bore 21 extending axially therethrough for receiving a coiled spring 22 which urges the locking member 16 outwardly longitudinally of the male member 10. An axially extending pin 23 is disposed centrally of the coil spring 22 and is connected to the locking member 16 to hold it in position on the male member 10. The bore 1 has a threaded portion 24 for engaging a threaded apertured stop or plug 25 which provides an abutting member for the spring 22 and also for the outer turned out ends 26 of the member 23.

It will be noted that the threaded portions 8 and 19 of the male and female members 1 and 10 respectively are opposite in direction in order that the lengths of open helically wound rods 7 and 30 will tend to turn towards the coupling members 1 and 10 when the lengths of wire 7 and 30 and the coupling members 1 and 10 are ro-rated in a counter clockwise direction which is the usual rotational direction when the connected rods are used with a leading auger for cleaning out a sewer or waste line. It will be evident that the threads may be reversed from the direction as shown in the drawings if desired.

Figure 6:
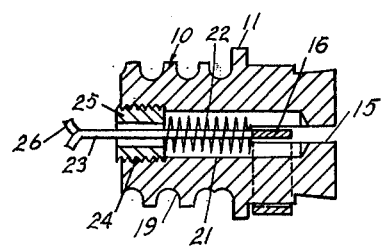
Fig. 6 is a vertical sectional view of the male coupling member of my novel coupling.

In operation, the locking member 16 is drawn longitudinally by grasping the finger engaging portions 17 and 18 of the locking member 16 to a position adjacent the shoulder 11 as shown in Figs. 4 and 6 against the force of the coil spring 22. The dovetailed groove 4 in female connecting portion 3 is then disposed on the dovetailed projection 13 of the male member 10 and the locking member 16 is released whereby the spring 22 moves it longitudinally to a locking position engaging the slots 15 and 5 in the male and female members 1 and 10 respectively. On disconnection, the locking member 16 is drawn longitudinally to a position shown in Fig. 4 and the female member 1 is drawn laterally outwardly.

It will be evident from the foregoing description that I have provided a novel coupling which will not become disconnected upon rotation thereof, which is very simple in construction and easy to connect and disconnect, which is especially adaptable for connecting lengthwise any type of rods, and which has further novel means for locking the ends of the wire onto the coupling members.

Various changes may be made in the specific embodiment of my invention without departing from the spirit thereof or from the scope of the appended claims.

What I claim is:

1. A coupling comprising a male member with a transversely slotted dovetailed projection, a female member having a transversely slotted projection with a dovetailed groove for engagement with said dovetailed projection on said male member, and a locking member in said transverse slots having the outer ends thereof projecting beyond the outer diametrically opposite sides of said slots whereby they can be engaged by the fingers to move said locking member longitudinally in said slots.

2. A coupling as set forth in claim 1 wherein a spring is provided in said male coupling member for urging said locking member into locking engagement when said male and female members are connected together.

3. A coupling comprising a male member having a projecting dovetailed projection with a transverse slot therein, a female member having a transversely slotted projecting portion with a dovetailed groove for engaging the dovetail projection of said male member, the slots in said male and female members being in alignment when said members are connected together, and a longitudinally movable locking member movable in said slots having the outer opposite ends thereof projecting beyond the opposite sides of said members whereby they can be engaged by the fingers.

4. A coupling as set forth in claim 3 wherein said locking member comprises a flat member having arcuate shaped finger engaging portions on opposite ends thereof.

5. A coupling comprising a male member having a dovetailed projecting portion with a transverse slot, a female member having a cross-slotted projecting portion with a dovetailed groove for engagng the dovetailed projection of said male member, and a manually operable, longitudinally movable locking member in the transverse slot of said male member, said locking member being adapted to engage the transverse slots in said male and female members when they are in engagement whereby they are locked in axial alignment, said locking member having the outer ends thereof turned arcuately in opposite directions for finger engagement.

6. A coupling as set forth in claim 5 wherein a spring is provided to urge said locking member into locking engagement in said slots.

7. A coupling comprising a male member having a transversely slotted projection with outwardly flared sides, a female member having a transversely slotted projection with flared sides corresponding to the sides of said projection on said male member for locking engagement therewith, and a locking member in said transverse slots having the outer ends thereof projecting beyond the outer diametrically opposite sides of said slots whereby they can be engaged by the fingers to move said locking member longitudinally in said slots.

KARL J. KOLLMANN.

REFERENCES CITED

The following references are of record in the file of this patent:

UNITED STATES PATENTS

| Number | Name | Date |
| --- | --- | --- |
| 1,805,014 | Schalk | May 12, 1931 |
| 2,278,324 | Kollmann | Mar. 31, 1942 |